May 22, 1962     E. E. REED     3,035,440

METHOD AND APPARATUS FOR TESTING FORMATIONS

Filed Aug. 30, 1957

INVENTOR.
E. E. REED

BY Hudson and Young

ATTORNEYS

United States Patent Office 3,035,440
Patented May 22, 1962

3,035,440
METHOD AND APPARATUS FOR
TESTING FORMATIONS
Edwin E. Reed, Bartlesville, Okla., assignor to Phillips Petroleum Company, a corporation of Delaware
Filed Aug. 30, 1957, Ser. No. 681,242
8 Claims. (Cl. 73—151)

This invention relates to a method and apparatus for testing formations. In one aspect this invention relates to a method for testing apparatus employed in testing formations. In another aspect this invention relates to apparatus which can be positioned adjacent a formation in a bore hole, first tested for leaks, and then opened hydraulically to permit testing of said formation.

Testing of underground formations for permeability, and for porosity, has long been carried out in connection with the drilling of oil wells, gas wells, water wells, etc. In recent years man-made underground caverns have come into widespread use for the storage of liquified petroleum gases such as propane and butane, and other products. In some instances these underground caverns are formed in salt domes by a washing operation. In other instances said caverns are formed in impermeable rock formations such as shale, limestone, etc. by mining operations.

In prospecting for sites for the location of underground caverns it is customary to drill relatively small core holes by means of conventional core drilling equipment so as to determine the nature of the underground formations. When an apparently favorable formation has been located it is desirable to test said formation so as to determine whether or not any fractures or fissures are present which would permit escape of stored products in any cavern which might be formed in the formation. Since even very small loss of fluid to the formation might cause it to be unsuitable, it is very important that there be no leaks in the apparatus employed to test the formation because a leak in the apparatus might cause abandonment of an otherwise favorable formation.

An object of this invention is to provide a method for testing an underground formation. Still another object of this invention is to provide an apparatus for testing an underground formation. Still another object of this invention is to provide a method for testing an apparatus prior to employing said apparatus for testing a formation. A further object of this invention is to provide an apparatus for testing a formation, which apparatus can be closed for testing of the apparatus per se, and then opened hydraulically for subsequent testing of said formation. Other aspects, objects, and advantages of the invention will be apparent to those skilled in the art in view of this disclosure.

Figure 1:
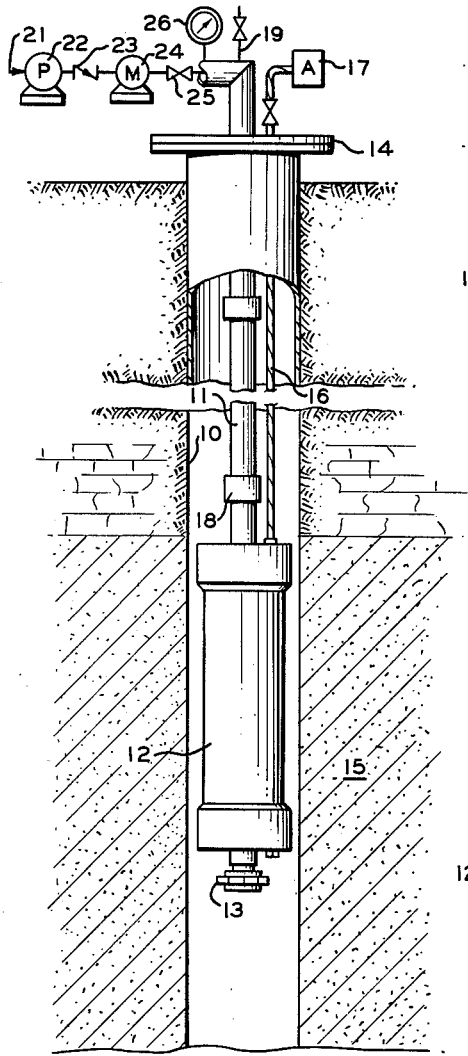
FIGURE 1 is an elevation, partially in cross section, illustrating one assembly of apparatus in accordance with the invention and positioned in a bore hole for testing a formation penetrated by said bore hole.

Referring now to the drawings, wherein like reference numerals have been employed to denote like elements, the invention will be more fully explained. In FIGURE 1 there is shown a bore hole 10 having positioned therein a tubing and packer assembly comprising a length or strand of tubing 11, a packer member 12, and a closure member 13. Said tubing and packer assembly is suspended in said bore hole by means of well head 14. Any suitable type of well head or suspension means can be employed. A hose 16 or other suitable conduit is connected to the upper end of said packer member 12 and extends without said bore hole 10 to a source of fluid supply 17, such as air, which can be employed for inflating a resilient portion of said packing member as described further hereinafter. Tubing 11 comprises a plurality of lengths of tubing connected by collars 18. A vent pipe 19 having a valve therein is provided in the upper end of said tubing. Conduit 21, connected to a source of liquid supply not shown, has pump 22, check valve 23, meter 24, and valve 25 positioned therein and is connected to the upper end of said tubing 11. Said conduit 21 and the apparatus disclosed therein comprises means for introducing a liquid under pressure into the interior of tubing 11. Alternatively, pump 22 can be a positive displacement pump having check valve 23 disposed therein, and meter 24 can be eliminated by calibrating said pump. A pressure gage 26 is provided for measuring the pressure within tubing 11. The apparatus in FIGURE 1 can be employed for testing a formation below packer member 12, when it is inflated to form a seal in the wall of the bore hole, to the bottom of said bore hole.

Figure 2:
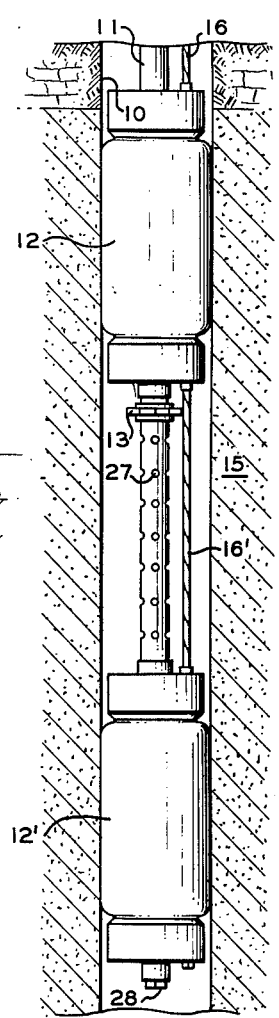
FIGURE 2 illustrates another assembly of an apparatus in accordance with the invention and positioned in a bore hole for testing a formation penetrated by said bore hole.

In FIGURE 2 there is illustrated a modification of the apparatus of the invention which can be employed to test a section of a formation between two packers positioned in a bore hole. As here illustrated, said packer members have been inflated so as to form a seal with the wall of the bore hole. A first packer member 12 is connected to the lower end of tubing 11 and a closure member 13 is connected to the lower end of said first packer member as in the apparatus of FIGURE 1. A hose 16 or other suitable conduit is also connected to said first packer member as in FIGURE 1. A perforated tube 27 is connected at its upper end to the lower side of said closure member 13 and is connected at its lower end to a second packer member 12'. A length of hose 16' or other suitable conduit connects said packer members. The lower end of said second packer member is closed by means of plug 28.

Figure 3:
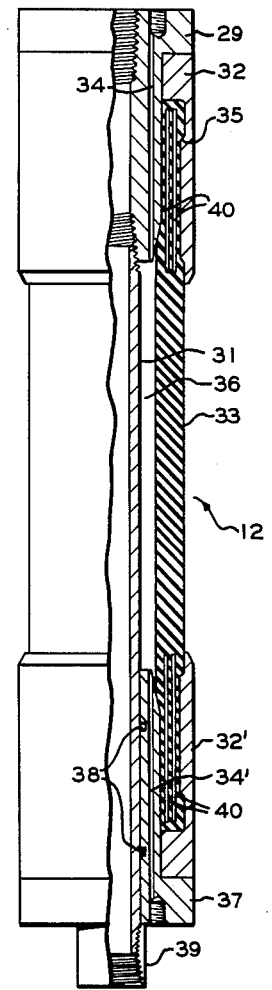
FIGURE 3 is an elevation view, partly in cross-section, illustrating one type of packer member which can be employed in the apparatus of the invention.

In FIGURE 3 the construction of packer member 12 is illustrated in detail. Said packer member comprises a first connector 29 which is threaded to the upper end of a rigid inner tube 31 which together with said connector 29 forms an extension of tube 11. A clamp member 32 fits slidably below a shoulder on said first connector 29 as shown, surrounds the lower portion of said connector 29, and forms a space between said connector 29 and the lower extended portion of said clamp 32 as shown. A resilient tube 33 has its upper end positioned in and is held in said space between clamp 32 and connector 29 by compression and friction aided by shoulder 35 on the inner wall of clamp 32. Said resilient tube 33 is made of rubber and is reinforced with two plies of fabric at each end. Conduit 34 formed in connector 29 provides communication to the space 36 between said rigid tube 31 and said resilient tube 33. The upper end of said conduit 34 is enlarged and threaded as shown to provide connecting means for a conduit such as hose 16. The lower end of clamp member 32' fits slidably adjacent a second connector 37 in like manner to that described for said members 29 and 32. However, said second connector 37 is in sliding sealed engagement with said inner tube 31. O-rings 38 form said sliding sealed engagement. A conduit 34' in said connector 37 provides communication with the space 36 between said rigid tube 31 and said resilient tube 33. A coupling 39 is threadedly engaged to the lower end of said rigid tube 31 and serves to hold said connector 37 in the position shown.

Figure 4:
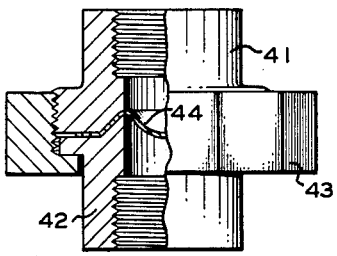
FIGURE 4 is an illustration, partly in cross section, illustrating a closure member which can be employed in the apparatus of the invention.

In FIGURE 4 there is illustrated one type of closure member which can be employed in the practice of the invention. Said closure member comprises a pipe union having an upper part 41 and a lower part 42 held together by means of flanged nut 43. A frangible impermeable diaphragm or closure plate 44 is disposed between said upper and said lower parts and across the openings therein.

In the practice of the invention, assume that a promising formation has been located by drilling core holes with conventional core drilling equipment. Said core holes are usually drilled about 3 to 4 inches in diameter and from 200 to 500 feet in depth. However, bore holes of smaller or larger diameter and less or greater depth can be employed. After location of a promising formation the apparatus illustrated in either FIGURE 1 or FIGURE 2 is assembled and suspended within a bore hole. The interior of the assembly, i.e., the interior of tubing 11 and inner tube 31 of packer member 12 down to diaphragm 44 in closure member 13 is filled with water or other liquid from conduit 21 by means of pump 22. The filling of said apparatus is preferably carried out slowly so as to not form pockets of entrapped air therein. During said filling, the valve in vent pipe 19 is opened to permit the escape of air. It is sometimes desirable to "pack" the interior of said apparatus after it is apparently full by closing the valve in conduit 19 and pressuring the liquid therein. Pressure can be released by means of valve 19 to aid in the escape of air which might possibly have been trapped in said apparatus.

After said apparatus has been filled with liquid, hydraulic pressure is applied by means of pump 22 so as to test the assembled apparatus for possible leaks. Usually a pressure in the neighborhood of 300–400 pounds per square inch is sufficient for this purpose. However, any suitable pressure depending upon the apparatus being employed can be used. Said pressure is held upon the apparatus for a period of time sufficient to show that no leaks exist in the assembled apparatus. After the operator is satisfied that no leaks exist in the apparatus, said hydraulic pressure is then increased to a value greater than the bursting point of diaphragm 44 in closure member 13. Said diaphragm 44 is usually selected to have a bursting point from 5 to 15 percent greater than the pressure at which the apparatus is tested for leaks.

After said diaphragm or closure plate 44 has been ruptured, fluid under pressure is introduced via hose 16 into space 36 between inner tube 31 and outer resilient tube 33 of packer member 12. Said fluid, usually compressed air, causes resilient tube 33 to become inflated as illustrated in FIGURE 2 and thus form a seal with the wall of bore hole 10. The pressure applied to resilient tube 33 to form said seal is usually from 100 to 200 pounds greater than the pressure at which the formation is to be tested. After thus setting packer 12 and forming said seal with the wall of bore hole 10, additional liquid is pumped into the interior of tubing 11 through tube 31 of packer 12 and out through ruptured closure plate 44 in closure member 13 into the bore hole in contact with formation 15 which is to be tested. Once the space between the seal formed by packer member 12 and the bottom of bore hole 10 is filled with liquid, pressure therein builds up rapidly to the desired test pressure. With some formations there may be an initial decrease from said test pressure due to "saturating" the face of said formation 15. If, however, said formation 15 is a suitable impermeable formation it will be found that after a relatively short period of time the test pressure in the bore hole below the seal formed by said packer member 12 remains essentially constant and the volume of liquid required to be pumped by pump 21 so as to maintain said test pressure is substantially zero. Indeed, it has been found with a number of formations that said volume of liquid is essentially zero, i.e., it can literally be measured in terms of drops rather than other conventional usually employed terms of volume measurement. Usually the amount of test pressure applied to said formation to test same will be within the range from 200 to 500 pounds per square inch. A convenient rule of thumb to employ in setting the upper limit for said test pressure in testing the formation is to apply approximately one pound of pressure per foot of depth. Said test pressure is usually maintained on the formation for a period of time ranging from several hours to several days depending upon the desired severity of the test. If said formation has cracks or fissures therein it will, of course, be impossible to maintain said pressure for any appreciable length of time without pumping additional liquid into the interior of the apparatus. Such cracks or fissures, as discussed above, render the formation unsuitable for the storage of liquid products.

If it is desired to test a section of the formation rather than the entire space below a single packer, the apparatus illustrated in FIGURE 2 can be employed. Said apparatus is filled, tested, and the diaphragm or closure plate 44 is ruptured or opened hydraulically as described in connection with FIGURE 1. The resilient tubes 33 of packer members 12 and 12' are then inflated by means of fluid introduced through conduit 16 in the same manner as previously described so as to form a pair of seals with the wall of bore hole 10. After setting of said packers 12 and 12' to form said seals, liquid is pumped by means of pump 21 into the interior of the apparatus and enters the space between said packers 12 and 12' by means of the perforations in perforated tube 27. Pressure is then applied to formation 15 as previously described. Thus the section of said formation 15 between the seals formed by packer members 12 and 12' can be tested.

The apparatus and method of the invention have several advantages over conventional apparatus normally employed in testing formations. As employed in testing core holes in connection with locations of underground caverns tubing 11 can conveniently be ¾ inch tubing and packers 12 and 12' can conveniently have an outside diameter of about 2⅛ to about 2¾ inches. Thus it will be seen that said apparatus is relatively small compared to that normally employed because in conventional apparatus, tubing 11 will normally be two inches or greater in diameter. The apparatus of the invention can readily and conveniently be assembled and no special tools are required.

By testing said apparatus prior to testing the formation it has been found that the certainty of eliminating leaks in the apparatus greatly increases the reliability of tests on the formation and eliminates repeat operations such as are necessary when it is not certain whether the apparatus is leaking or whether the formation is taking liquid. The advantages of the feature of the invention which allows hydraulic rupturing of the diaphragm or closure plate in closure member 13 will be readily appreciated by those skilled in the art.

While the invention has been described in connection with the testing of underground formations to determine their suitability for the location of underground storage caverns, the invention is not to be so limited. The invention can be applied to any formation whether man-made or natural, and either underground or above ground. For example, it may be desirable in some instances to determine the permeability, i.e., whether or not there are internal cracks or fissures in a large man-made structure or formation such as a concrete dam, wall, etc.

Various other modifications of the invention can be made, or followed, in view of the above disclosure, by those skilled in the art. Such modifications are believed to be within the spirit and scope of the invention.

I claim:

1. A method of testing the permeability of a formation penetrated by a bore hole, which method comprises in combination, the steps of: applying hydraulic pressure to the interior of a closed tubing and packer assembly positioned in said bore hole, at the desired elevation, to test said assembly for possible leaks; maintaining and measuring said hydraulic pressure on said assembly for a period of time sufficient to show that no leaks exist in said assembly; applying increased hydraulic pressure to the interior of said assembly to open said assembly and thereby place the interior of said assembly in communication with said bore hole; applying fluid pressure to a packer in said assembly to form and maintain a seal with the wall of said bore hole adjacent the formation to be tested; pumping liquid through said assembly into said bore hole below said seal to establish and maintain a predetermined pressure in a region of said bore hole below said seal; subjecting said formation to said predetermined pressure for a predetermined period of time; and measuring the volume of said liquid necessary to maintain said established predetermined pressure for said period of time.

2. A method of testing the permeability of a formation penetrated by a bore hole, which method comprises, in combination; the steps of: applying hydraulic pressure to the interior of a closed tubing and packer assembly positioned in said bore hole, at the desired elevation, to test said assembly for possible leaks; maintaining and measuring said hydraulic pressure on said assembly for a period of time sufficient to show that no leaks exist in said assembly; applying increased hydraulic pressure to the interior of said assembly to rupture a closure plate closing said assembly and thereby place the interior of said assembly in communication with said bore hole; applying fluid pressure to a packer in said assembly to form and maintain a seal with the wall of said bore hole adjacent the formation to be tested; pumping liquid through said assembly into said bore hole below said seal to establish and maintain a predetermined pressure in a region of said bore hole below said seal; subjecting said formation to said predetermined pressure for a predetermined period of time; and measuring the volume of said liquid necessary to maintain said established predetermined pressure for said period of time.

3. A method of testing the permeability of a formation penetrated by a bore hole, which method comprises in combination, the steps of: applying hydraulic pressure to the interior of a closed tubing and packer assembly positioned in said bore hole, at the desired elevation, to test said assembly for possible leaks; maintaining and measuring said hydraulic pressure on said assembly for a period of time sufficient to show that no leaks exist in said assembly; applying increased hydraulic pressure to the interior of said assembly to open said assembly and thereby place the interior of said assembly in communication with said bore hole; applying fluid pressure to a pair of spaced apart packers in said assembly to form and maintain a pair of spaced apart seals with the wall of the formation to be tested; pumping liquid through said assembly into the region of said bore hole between said seals to establish and maintain a predetermined pressure therein for a predetermined period of time; and measuring the volume of said liquid necessary to maintain said established predetermined pressure for said period of time.

4. Apparatus for testing the permeability of a formation penetrated by a bore hole, which comprises, in combination: a length of tubing suspended in said bore hole, the upper end of said tubing extending without said bore hole and the lower end of said tubing being adjacent the formation to be tested; a packer member comprising a rigid inner tube surrounded by a resilient tube adapted to be inflated so as to form a seal with the wall of said bore hole, the upper end of said inner tube being connected to said lower end of said tubing; a closure member connected to the lower end of said inner tube, said closure member comprising a pipe union having a frangible, impermeable diaphragm disposed between the two parts thereof and across the opening therethrough, said diaphragm being adapted to rupture at a predetermined maximum pressure; a hose connected to said packer member and extending without said bore hole for inflating said resilient tube of said packer so as to form a seal with the wall of said bore hole; and means for introducing a measured quantity of liquid under pressure into the upper end of said tubing.

5. Apparatus for testing the permeability of a formation penetrated by a bore hole, which comprises, in combination: a length of tubing suspended in said bore hole, the upper end of said tubing extending without said bore hole and the lower end of said tubing being adjacent the formation to be tested: a first packer member comprising a rigid inner tube surrounded by a resilient tube adapted to be inflated so as to form a seal with the wall of said bore hole, the upper end of said inner tube being connected to said lower end of said tubing; a closure member connected to the lower end of said inner tube, said closure member comprising a pipe union with a frangible, impermeable diaphragm disposed between the two parts thereof and across the opening therethrough, said diaphragm being adapted to rupture at a predetermined maximum pressure; a length of perforated tubing connected at its upper end to the lower side of said closure member; a second packer member, like said first packer member, connected at the upper end of its inner tube to the lower end of said perforated tubing; a hose connected to said first packer member and extending without said bore hole for inflating said resilient tube of said first packer member so as to form a seal with the wall of said bore hole; a second hose connecting said first and second packer members and in communication with said first hose for inflating said second packer member; and means for introducing a measured quantity of liquid under pressure into the upper end of said tubing.

6. A method of testing the permeability of a formation penetrated by a borehole, which method comprises, in combination, the steps of: applying hydraulic pressure to the interior of a closed tubing and packer assembly positioned in said borehole, at the desired elevation, to test said assembly for possible leaks; maintaining and measuring said hydraulic pressure on said assembly for a period of time sufficient to show that no leaks exist in said assembly; applying increased hydraulic pressure to the interior of said assembly to open said assembly and thereby place the interior of said assembly in communication with said borehole; applying fluid pressure to a packer in said assembly to form and maintain a seal with the wall of said borehole and adjacent the formation to be tested; pumping liquid through said assembly into a confined region in said borehole below said seal to establish and maintain a predetermined pressure; subjecting said formation to said predetermined pressure for a predetermined period of time; and measuring the volume of said liquid necessary to maintain said established predetermined pressure for said period of time.

7. Apparatus for testing the permeability of a formation penetrated by a bore hole, which comprises, in combination: a tubing; a packer member comprising a rigid inner tube surrounded by an outer resilient tube adapted to be inflated so as to form a seal with the wall of said bore hole, the upper end of said inner tube being connected to the downhole end of said tubing and the lower end of said inner tube extending below said packer member; means for inflating said packer member to form a seal with the wall of said bore hole; means for introducing a measured quantity of liquid under pressure into said tubing; and a closure member connected to said lower end of said inner tube, said closure member having a frangible, impermeable closure plate disposed therein adapted to rupture at a predetermined maximum pressure and admit said liquid from said tubing into said bore hole below said packer member.

8. Apparatus for testing the permeability of a formation penetrated by a bore hole, which comprises, in combination: a tubing; a first packer member comprising a rigid inner tube surrounded by an outer resilient tube adapted to be inflated so as to form a seal with the wall of said bore hole, the upper end of said inner tube being connected to the downhole end of said tubing and the lower end of said tube extending below said first packer member; a closure member connected to said lower end of said inner tube, said closure member having a frangible, impermeable closure plate disposed therein adapted to rupture at a predetermined maximum pressure; a perforated tubing connected at its upper end to said closure member; a second packer member, like said first packer member, connected at the upper end of its inner tube to the lower end of said perforated tubing; a plug disposed in the lower end of said inner tube of said second packer member; means for inflating said packers to form a pair of seals with the wall of said bore hole; and means for introducing a measured quantity of liquid under pressure into said tubing to cause said closure plate to rupture at said predetermined maximum pressure and admit said liquid to the region of said bore hole between said packer members.

References Cited in the file of this patent
UNITED STATES PATENTS

| | | |
|---|---|---|
| 2,216,268 | Fritsche | Oct. 1, 1940 |
| 2,218,155 | Rusler | Oct. 15, 1940 |
| 2,461,727 | Gardner | Feb. 15, 1949 |
| 2,605,637 | Rhoades | Aug. 5, 1952 |
| 2,706,397 | Byrkett | Apr. 19, 1955 |